United States Patent [19]

Rogers

[11] Patent Number: 5,147,096
[45] Date of Patent: Sep. 15, 1992

[54] EASY LATCH AND UNLATCH CAM ACTION TRAILER HITCH

[76] Inventor: Gerald H. Rogers, Rte. 1, Box 1336, Athens, Tex. 75751

[21] Appl. No.: 782,618

[22] Filed: Oct. 25, 1991

[51] Int. Cl.$^5$ .............................................. B60D 1/28
[52] U.S. Cl. .................................... 280/507; 280/513
[58] Field of Search ................ 280/456.1, 477, 491.1, 280/491.2, 491.5, 501, 504, 507, 511, 512, 513; 70/58, 229, 230, 231, 232, 258

[56] References Cited

U.S. PATENT DOCUMENTS

| | | | |
|---|---|---|---|
| 1,636,295 | 7/1927 | Dempsey | 280/513 |
| 2,902,294 | 9/1959 | Kirkpatrick | 280/512 |
| 3,773,358 | 11/1973 | Butler et al. | 280/513 |
| 4,225,261 | 9/1980 | Marx | 280/513 |
| 5,011,177 | 4/1991 | Grice | 280/491.2 X |

*Primary Examiner*—Charles A. Marmor
*Assistant Examiner*—Jeffrey A. Kuta
*Attorney, Agent, or Firm*—Warren H. Kintzinger

[57] ABSTRACT

A trailer hitch is provided where a longitudinally moveable rectangular cap is slidably mounted on a rectangular (square in some instances) pipe used as a trailer hitch tongue mounting within its lead end a trailer hitch ball socket member welded in place in the pipe with the socket opening therein facing downwardly. The rectangular cap is provided with an enlarged opening in the bottom thereof that with the cap slid forwardly to an open position that permits passage of a trailer hitch ball through the enlarged opening into and removal from the socket opening in the trailer hitch ball socket member. The rectangular cap has a narrow opening extension from the enlarged opening such that when the cap is slid back the opening extension while large enough to accommodate the shank of the trailer hitch ball is narrow enough to capture the trailer hitch ball locking it in place in the ball socket opening. An eccentric cam structure rotatably mounted in the pipe has opposite side end cams received in opposite side rectangular openings in the cap and includes a cam movement arm that is lockable in a cap closed position.

11 Claims, 3 Drawing Sheets

EASY LATCH AND UNLATCH CAM ACTION TRAILER HITCH

BACKGROUND OF THE INVENTION

This invention relates in general to vehicle trailer hitches and more particularly, to an easy latch and unlatch cam action trailer hitch.

There are many different trailer hitches available on the market some of which have structural weaknesses and some where a trailer hitch ball on the pulling vehicle is not securely retained in the trailer hitch ball socket. Further, insertion of the trailer hitch ball in the receiving socket and also removal unhitching thereof is at times, with some of the existing trailer hitches, not only a tedious, ardous time consuming task but also a dangerous, hazardous activity for those doing the hitching or unhitching of a trailer hitch.

It is therefore a principal object of this invention to provide an easy to latch and unlatch trailer hitch.

Another object is to provide such a trailer hitch safe to use by both men and women.

A further object is to provide a trailer hitch with safe positive locking of a trailer hitch ball in the hitch ball socket.

Still another object is to provide such a trailer hitch with a cam action lever arm lockable in the hitched state by a padlock.

SUMMARY OF THE INVENTION

Features of the invention useful in accomplishing the above objects include, in an easy latch and unlatch cam action trailer hitch, a longitudinally moveable rectangular cap slidably mounted on a rectangular (square in some instances) pipe used as a trailer hitch tongue mounting within its lead end a trailer hitch ball socket member welded in place in the pipe with the socket opening therein facing downwardly. The rectangular cap is provided with an enlarged opening in the bottom thereof that with the cap slide forwardly to an open position permits passage of a trailer hitch ball through the enlarged opening into and removal from the socket opening in the trailer hitch ball socket member. The rectangular cap has a narrow opening extension from the enlarged opening such that when the cap is slid back the opening extension while large enough to accomodate the shank of the trailer hitch ball is narrow enough to capture the trailer hitch ball locking it in place in the ball socket opening. An eccentric cam structure rotatably mounted in the pipe has opposite side end cams received in opposite side rectangular openings in the cap and includes a cam movement arm that is lockable in a cap closed position.

A specific embodiment representing what is presently regarded as the best mode of carrying out the invention is illustrated in the accompanying drawings.

DESCRIPTION OF THE PREFERRED EMBODIMENT

Figure 1:
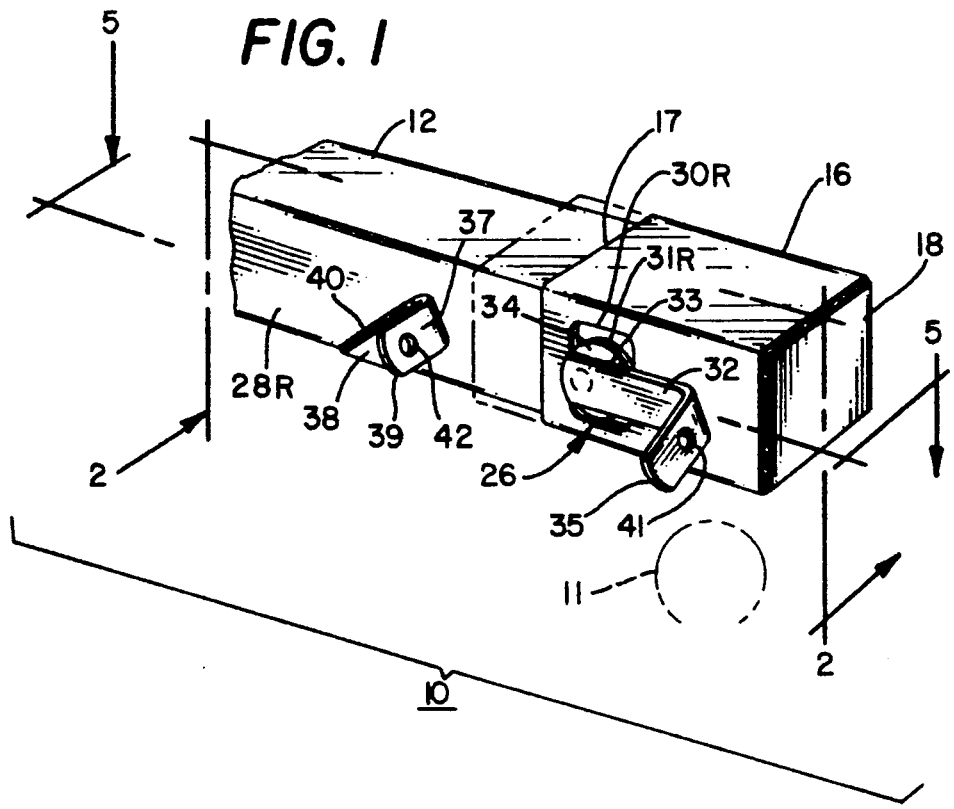
FIG. 1 represents a perspective view of the trailer hitch trailer tongue with the longitudinally moveable cap cam drive positioned in its forward position.
Figure 2:
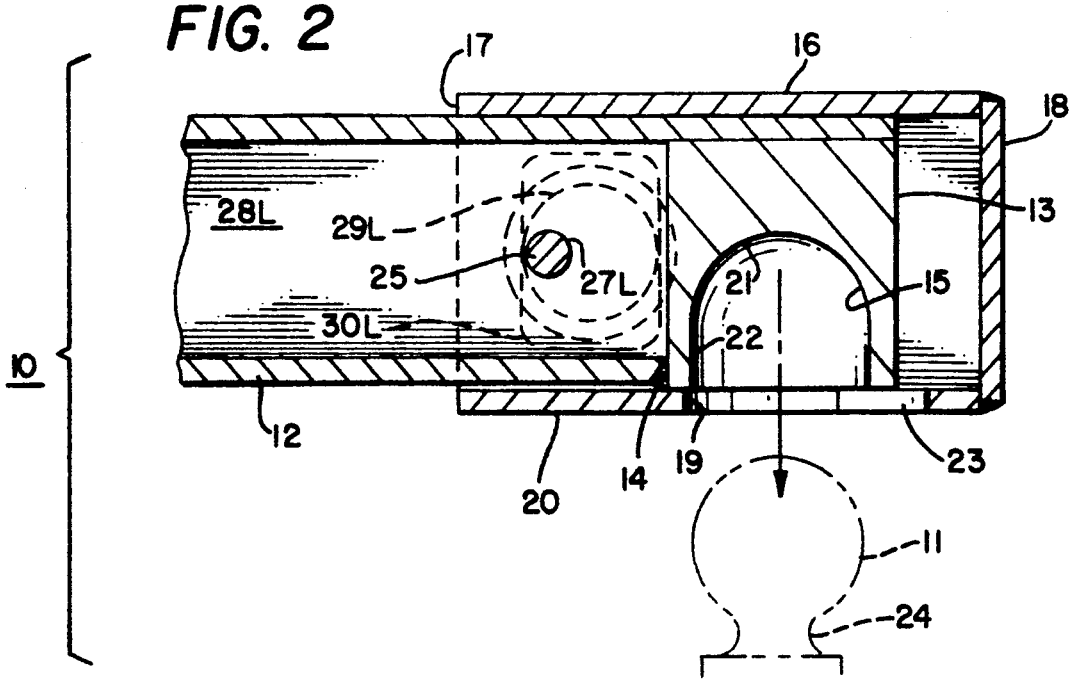
FIG. 2, a cut away and sectioned view of the trailer hitch tongue assembly, taken along line 2—2 of FIG. 1, with the cap cam drive positioned in its forward position.
Figure 3:
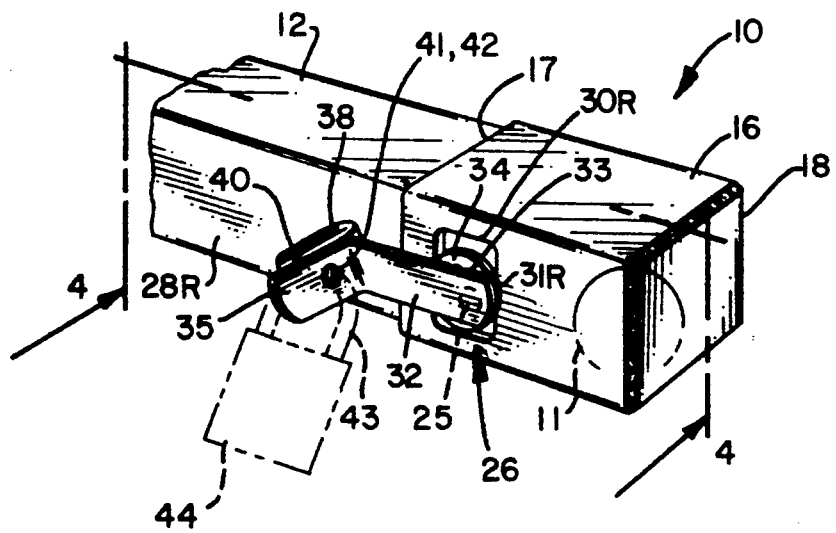
FIG. 3, a perspective view of the trailer hitch trailer tongue, like FIG. 1, with, however, the longitudinally moveable cap cam drive positioned in its rear position that locks an inserted trailer hitch ball in place in the ball socket of the hitch.
Figure 4:
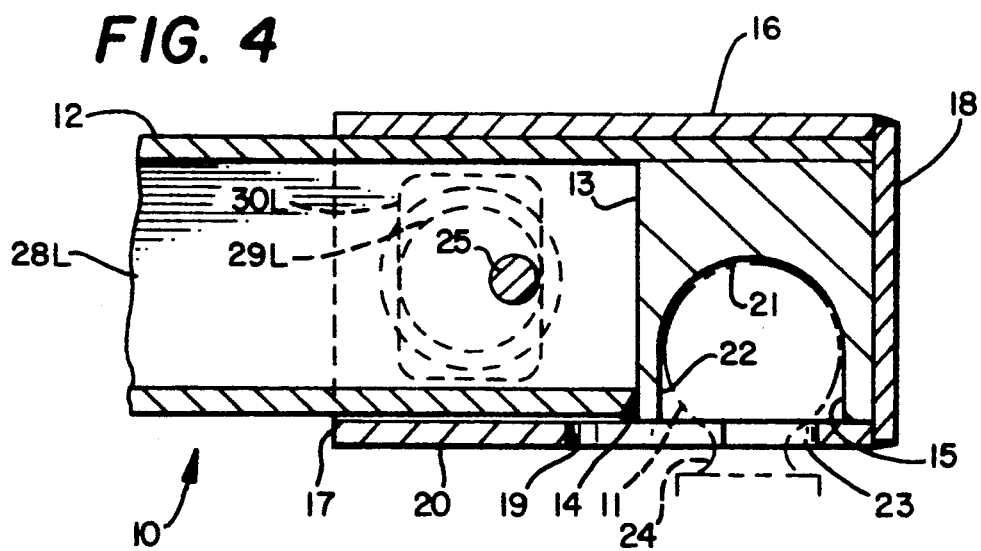
FIG. 4, a broken away and sectioned view of the trailer hitch tongue assembly taken along line 4—4 of FIG. 3.
Figure 5:
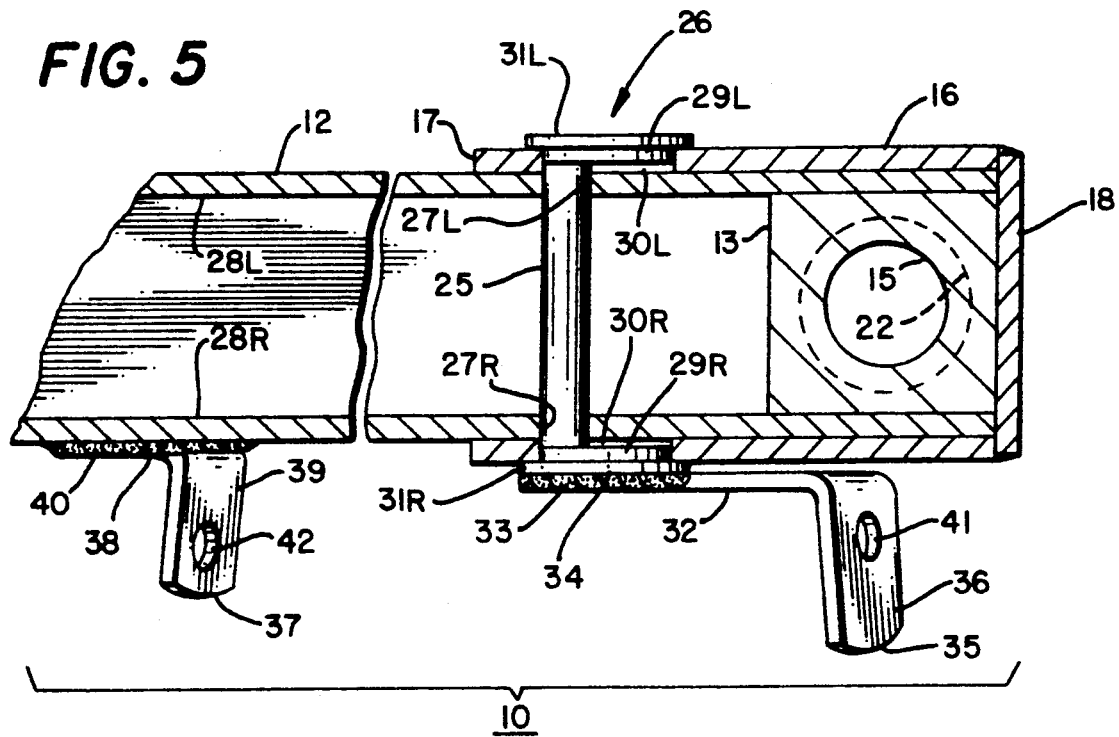
FIG. 5, a broken away and sectioned view of the trailer hitch tongue assembly taken along line 5—5 of FIG. 1 with the longitudinally moveable cap cam drive positioned in its forward position; and, FIG. 6, an upside down perspective view of the trailer hitch tongue assembly with the longitudinally moveable cap cam drive positioned in its rearward position and showing trailer hitch ball entry opening and in place restraining opening extension detail.
Figure 6:
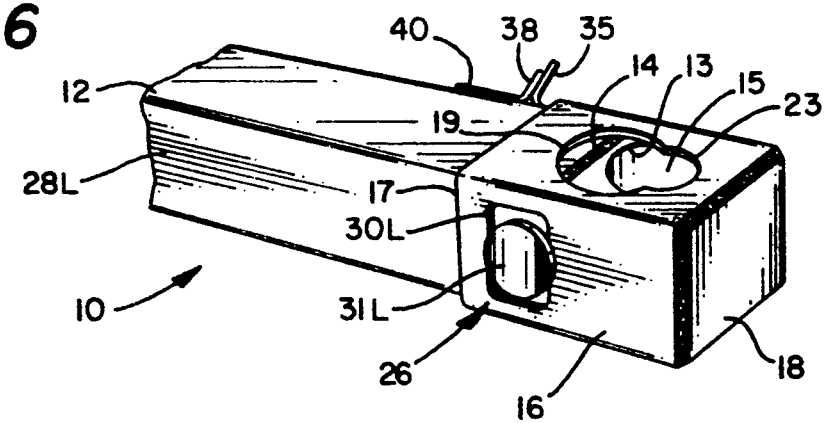

Referring to the drawings:

The trailer hitch tongue assembly 10, of FIGS. 1-6, latchable and unlatchable to a trailer hitch ball 11 is shown to include a rectangular (actually square in cross section) hollow metal pipe tongue 12. A trailer hitch ball socket member 13 is welded 14 in place within the forward end of the pipe tongue 12 with the spherical section socket opening 15 therein facing downwardly. Rectangular in transverse cross section cap 16, longitudinally slidably mounted on the forward end of the hollow metal pipe tongue 12, has an open rear end 17 and a closed wall 18 forward end. The rectangular cap 16 has an enlarged opening 19 in the bottom wall 20 thereof that with the cap 16 slid forwardly to an open position permits passage of trailer hitch ball 11 through the enlarged opening 19 into, or removal from the socket opening 15 with a spherical top section 21 and a straight cylindrical shank 22 in the trailer hitch ball socket member 13. There is a forwardly extended narrow opening extension 23 from the enlarged opening 19 such that when the cap 16 is slid back the opening extension while large enough to accomodate the shank 24 of the trailer hitch ball 11 it is narrow enough to capture the trailer hitch ball 11 locking it in place in the ball socket opening 15.

A rotatable cam shaft 25 of eccentric cam structure 26 extends through opposite side wall openings 27L and 27R within which shaft 25 is a rotatable fit. Outwardly mounted from opposite pipe tongue 12 sides 28L and 28R opposite side cam wheels 29L and 29R are non-rotatably fixed to cam shaft 25 as by being a press fit thereon, so as to rotate with the shaft 25. Cam wheels 29L and 29R fit within opposite side slots 30L and 30R of cap 16. Opposite end containment disk 31L and 31R are mounted on the outer sides of cam wheels 29L and 29R and cam movement arm 32 is welded 33 to the outer surface 34 of containment disk 31R. Cap 16 is cam driven between the forward ball 11 accessable insert to socket 15 or removal forward position states of FIGS. 1, 2 and 5, and the rearward ball 11 retaining state of FIGS. 3, 4 and 6. Outwardly turned tab flange end 35 of cam movement arm 32 is angled and shaped to come into flush face 36 engagement with angled face 37 of bracket 38 outward projecting arm 39 with the bracket 38 welded 40 to the outer face of pipe tongue side 28R. When cam movement arm 32 is moved along with cap 16 to the rearward ball 11 retaining state of FIGS. 3, 4 and 6 opening 41 in tab flange end 35 is aligned with opening 42 in bracket arm 39 and hasp 43 of padlock 44 may be locked through the openings 41 and 42 to lock the trailer hitch 10 in that state.

Whereas this invention has been described with respect to a single embodiment thereof, it should be realized that various changes may be made without departure from the essential contributions to the art made by the teachings hereof.

I claim:

1. An easy latch and unlatch vehicle trailer hitch comprising: a trailer hitch tongue rectangular in transverse section having a lead end, opposite side walls and a top wall; a trailer hitch ball socket member mounted in place within said lead end of the trailer hitch tongue and having a socket opening therein facing downwardly, sized and shaped to receive a spherical section surfaced trailer hitch ball; a rectangular cap member slidably mounted on and generally enclosing the lead end of said trailer hitch tongue with said cap member including a top, opposite sides and a bottom side; opening means in said bottom side having a large opening portion and a narrow opening extension extended forwardly from said large opening portion; said cap slidable to a forward position with said large opening portion in alignment with said socket opening permitting passage of a trailer hitch ball through said large opening portion into and removal from said socket opening; and with the narrow opening extension being so dimensioned that when said cap member is slid back from said forward position while large enough to accomodate the shank of the trailer hitch ball it is narrow enough to capture the trailer hitch ball locking it in place in said ball socket opening; wherein positioning drive means is provided for positioning said rectangular cap member back and forth on said trailer hitch tongue between said forward position and a rearward position; said rectangular cap member has a forward end wall with an inside surface in close adjacency with the forward end of said trailer hitch tongue when said rectangular cap member is in its rearward position on said trailer hitch tongue; and wherein said positioning drive means is a cam drive rotatably mounted in side wall means of said trailer hitch tongue.

2. An easy latch and unlatch vehicle trailer hitch comprising: a trailer hitch tongue rectangular in transverse section having a lead end, opposite side walls and a top wall; a trailer hitch ball socket member mounted in place within said lead end of the trailer hitch tongue and having a socket opening therein facing downwardly, sized and shaped to receive a spherical section surface trailer hitch ball; and rectangular cap member slidably mounted on and generally enclosing the lead end of said trailer hitch tongue with said cap member including a top, opposite sides and a bottom side; opening means in said bottom side having a large opening portion and a narrow opening extension extended forwardly from said large opening portion; said cap slidable to a forward position with said large opening portion in alignment with said socket opening permitting passage of a trailer hitch ball through said large opening portion into and removal from said socket opening; and with the narrow opening extension being so dimensioned that when said cap member is slid back from said forward position while large enough to accomodate the shank of the trailer hitch ball it is narrow enough to capture the trailer hitch ball locking it in place in said ball socket opening; wherein positioning drive means is provided for positioning said rectangular cap member back and forth on said trailer hitch tongue between said forward position and a rearward position; and said positioning drive means is a cam drive rotatably mounted in side wall means of said trailer hitch tongue.

3. The easy latch and unlatch vehicle trailer hitch of claim 2, wherein said cam drive includes a cam mounting shaft rotatably mounted in shaft openings in said opposite side walls of said trailer hitch tongue.

4. The easy latch and unlatch vehicle trailer hitch of claim 3, wherein a cam wheel is mounted on each end of said cam mounting shaft; opposite side wall parallel edge sided openings in said rectangular cap member; with said cam wheels aligned with the opposite side walls of said cap member and siding on the parallel sides of said cap opposite side wall parallel sided openings in cam driving said cap member between said forward position and said rearward position.

5. The easy latch and unlatch vehicle trailer hitch of claim 4, wherein a cam movement arm is non-rotatably fastened to said cam drive.

6. The easy latch and unlatch vehicle trailer hitch of claim 5, wherein opposite end containment disks are fixed to the outer sides of said cam wheels and extend outward beyond the parallel edges of said cap opposite side wall parallel edge sided openings.

7. The easy latch and unlatch vehicle trailer hitch of claim 6, wherein said cam movement arm is welded to the outer surface of one of said containment disks.

8. The easy latch and unlatch vehicle trailer hitch of claim 7, wherein said cam movement arm has an outwardly turned tab flange end.

9. The easy latch and unlatch vehicle trailer hitch of claim 8, wherein a bracket welded to the side of said trailer hitch tongue has an outward projecting arm.

10. The easy latch and unlatch vehicle trailer hitch of claim 9, wherein the bracket outward projecting arm and said outwardly turned tab flange end of said cam movement arm are so angled and shaped as to come into flush face engagement when the said rectangular cap member is cam driven to its rearward position.

11. The easy latch and unlatch vehicle trailer hitch of claim 9, wherein said bracket outward projecting arm and said outwardly turned flange end have through openings that are in adjacent alignment when said rectangular cap member is cam driven to its rearward position.

* * * * *